United States Patent
Hoshii

(10) Patent No.: US 7,433,081 B2
(45) Date of Patent: Oct. 7, 2008

(54) COLOR CONVERSION FOR PRINTERS

(75) Inventor: Jun Hoshii, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 631 days.

(21) Appl. No.: 11/029,654

(22) Filed: Jan. 4, 2005

(65) Prior Publication Data

US 2005/0190387 A1 Sep. 1, 2005

(30) Foreign Application Priority Data

Jan. 7, 2004 (JP) .............................. 2004-001826

(51) Int. Cl.
*G06F 15/00* (2006.01)

(52) U.S. Cl. .................... 358/1.9; 358/500; 358/3.23; 382/162

(58) Field of Classification Search .................. 358/1.9, 358/500, 523, 524, 3.23, 1.2; 382/162, 163, 382/164, 165, 166, 167
See application file for complete search history.

(56) References Cited

U.S. PATENT DOCUMENTS

| | | | | |
|---|---|---|---|---|
| 5,241,609 A | * | 8/1993 | Hasebe et al. | ............... 382/163 |
| 5,847,692 A | * | 12/1998 | Ono | ........................... 358/523 |
| 6,115,140 A | * | 9/2000 | Bresler et al. | ................ 358/1.9 |
| 6,396,595 B1 | * | 5/2002 | Shimazaki | ................... 358/1.9 |
| 6,434,268 B1 | * | 8/2002 | Asamura et al. | ............ 382/162 |
| 6,522,427 B1 | * | 2/2003 | Bhattacharjya et al. | ...... 358/1.9 |
| 6,556,707 B1 | * | 4/2003 | Yagishita et al. | ............ 382/162 |
| 6,621,497 B1 | * | 9/2003 | Sugiura et al. | ............. 382/167 |
| 6,865,292 B1 | * | 3/2005 | Kagawa et al. | ............. 382/167 |
| 7,068,380 B2 | * | 6/2006 | Milton et al. | .............. 358/3.23 |
| 7,163,270 B2 | * | 1/2007 | Hoshii | ........................ 358/1.2 |
| 7,292,356 B2 | * | 11/2007 | Otokita | ...................... 358/1.9 |

FOREIGN PATENT DOCUMENTS

JP 2003-271327 9/2003

OTHER PUBLICATIONS

Abstract of Japanese Patent Publication No. 2003-271327, Pub. Date: Sep. 26, 2003, Patent Abstracts of Japan.

* cited by examiner

*Primary Examiner*—Mark Zimmerman
*Assistant Examiner*—Henry Dahbour
(74) *Attorney, Agent, or Firm*—Martine Penilla & Gencarella, LLP

(57) ABSTRACT

A plurality of color conversion profiles are prepared for each of plural types of color conversion profiles. One profile is selected for each of the color conversion profile types according to the printing mode used when printing, and color conversion is performed by sequentially using the selected color conversion profiles, without combining these selected color conversion profiles.

2 Claims, 4 Drawing Sheets

Fig.3A
Source Profile 10

| Profile ID | Input Color Space |
|---|---|
| SP1 | sRGB |
| SP2 | AdobeRGB |
| SP3 | xRGB |

Fig.3B
Media Profile 20

| Profile ID | Print Media |
|---|---|
| MP1 | plain paper |
| MP2 | photo paper |
| MP3 | matt paper |

Fig.3C
Base LUT 30

| Profile ID | Print Media | Printing Resolution |
|---|---|---|
| BL1 | plain paper | R1(360 × 360dpi) |
| BL2 | | R2(720 × 720dpi) |
| BL3 | | R3(1440 × 720dpi) |
| – | | R4(1440 × 1440dpi) |
| – | | R5(2880 × 1440dpi) |
| – | photo paper | R1(360 × 360dpi) |
| – | | R2(720 × 720dpi) |
| BL4 | | R3(1440 × 720dpi) |
| BL5 | | R4(1440 × 1440dpi) |
| BL6 | | R5(2880 × 1440dpi) |
| – | matt paper | R1(360 × 360dpi) |
| – | | R2(720 × 720dpi) |
| BL7 | | R3(1440 × 720dpi) |
| BL8 | | R4(1440 × 1440dpi) |
| BL9 | | R5(2880 × 1440dpi) |

COLOR CONVERSION FOR PRINTERS

CROSS REFERENCE TO RELATED APPLICATIONS

The present application claims the priority based on Japanese Patent Application No. 2004-1826 filed on Jan. 7, 2004, the disclosure of which is hereby incorporated by reference in its entirety.

BACKGROUND OF THE INVENTION

1. Field of the Invention

The present invention relates to color conversion methods for color printers.

2. Description of the Related Art

Printer drivers that generate printing data for printers use various color conversion profiles for color conversion (see JP-2003-271327-A).

ICC profiles, based on ICC (International Color Consortium) standards, are commonly used for color conversion profiles. Two types of ICC profiles, source profiles and destination profiles, are normally used. As is well known, the source profile is used to convert the color space of an input device, such as a digital camera, scanner, or the like (input color space) to a profile connection space. The destination profile is used to convert the profile connection space to the color space of an output device, such as a printer, monitor, or the like (output color space). Either lookup tables or conversion matrices may be used as the data format for the ICC profiles.

Conventionally, a printer color conversion lookup table, wherein the source profile and the destination profile have been combined, is created in advance and installed on a computer. This color conversion lookup table converts the input device color space (such as an sRGB color space) into a printer ink color space (such as a CMYK color space). Such printer color conversion lookup tables are created to suit printing modes used when printing. However, as conventional pre-combined printer color conversion lookup tables were stored on CD-ROMs and the like, these pre-combined printer color conversion lookup tables led to increases in the size of the printer drivers on the CD-ROM, which reduced the amount of space available for other areas. Furthermore, performing the combination during printing is disadvantageous in that it lowers processing speeds.

SUMMARY OF THE INVENTION

An object of the present invention is to provide a method capable of reducing the size of a printer driver, both before and after installation, and avoiding excessive print times owing to time spent combining the color conversion profiles.

A method according to one aspect of the present invention is a color conversion method for a color printer comprising the steps of: (a) providing a plurality of color conversion profiles for each of plural types of color conversion profiles; (b) selecting one color conversion profile for each of the color conversion profile types, according to a printing mode used when printing; and (c) performing color conversion by sequentially using the selected color profiles, without combining these selected color profiles; wherein the printing mode is determined based on a plurality of parameters including input color space, print medium and printing resolution, and wherein the plural types of color conversion profiles includes: a plurality of a first type of color conversion profiles, one of which is selected according to the input color space; a plurality of a second type of color conversion profiles, one of which is selected according to the print medium; and a plurality of a third type of color conversion profiles, one of which is selected according to a combination of print medium and printing resolution.

According to this method, the plural types of color conversion profiles are selected according to the printing mode and sequentially used to perform color conversion without combining the color conversion profiles, thereby avoiding excessive print times owing to time spent combining the color conversion profiles. Furthermore, as there is no need to create all of the many possible color conversion lookup tables that can be produced by combining the plural profile types, it is possible to reduce the size of the printer driver, both before and after installation.

The first type of color conversion profile may serve to convert a first RGB color space, which is the input color space, to a predetermined profile connection space; the second type of color conversion profile may serve to convert the profile connection space to a second RGB color space; and the third type of color conversion profile may serve to convert the second RGB color space to an ink color space for a plurality of inks used by a specific printer.

By virtue of this constitution, the first RGB color space can be converted to corresponding suitable amounts of ink.

Note that the present invention can be carried out in various modes. For example, it may be carried out as a printer driver installation method and device, as a printing method and printing device, as a computer program for implementing the functions of these methods and devices, as a storage medium storing this computer program, as a data signal embodied in a carrier wave including this computer program.

The above and other objects, features, modes and advantages of the present invention will be apparent from the following description of the preferred embodiments in conjunction with the accompanying drawings.

BRIEF DESCRIPTION OF THE DRAWINGS

FIGS. 3A to 3C are schematic views illustrating the relationships between three types of color conversion profiles and various printing parameters.

DESCRIPTION OF THE PREFERRED EMBODIMENTS

Figure 1:
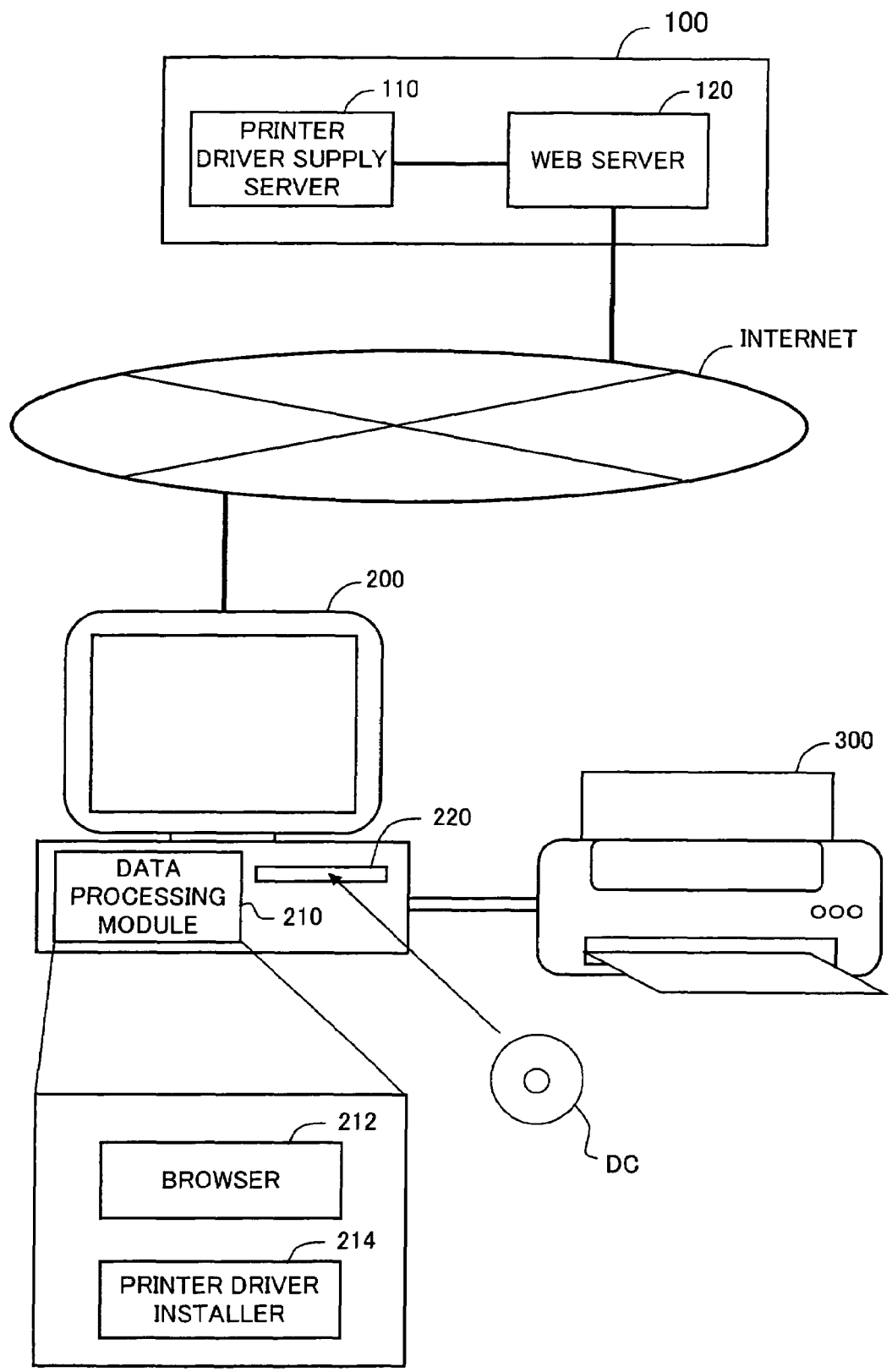
FIG. 1 is a schematic view illustrating the overall constitution of a network system serving as one embodiment of the present invention.

FIG. 1 is a schematic view illustrating the overall constitution of a network system serving as one embodiment of the present invention. This system comprises a support center 100 and a client computer 200, which are connected via the Internet. The client computer 200 is connected to a color printer 300.

The support center 100 comprises a printer driver supply server 110 and a web server 120. These two servers 110 and 120 may run on separate computer hardware devices or on a single computer hardware device. Furthermore, the service provided by the two servers 110 and 120 may be supplied by one server.

The two servers 110 and 120 store various files and program modules for supplying printer drivers via the Internet.

For example, the web server 120 stores various web pages including a printer support home page, a printer driver supply page. The printer driver supply server 110 stores installation programs for printer drivers suitable for various different printers.

The client computer 200 comprises a data processing module 210 and a disk drive 220. The data processing module 210 comprises a CPU and a memory device and can implement various functions by means of executing computer programs. In the example illustrated in FIG. 1, the data processing module 210 has functions of a browser 212 and a printer driver installer 214. The printer driver installer 214 is supplied by way of a recording medium disk DC, which is inserted into the disk drive 220, or from the printer driver supply server 110.

Figure 2:
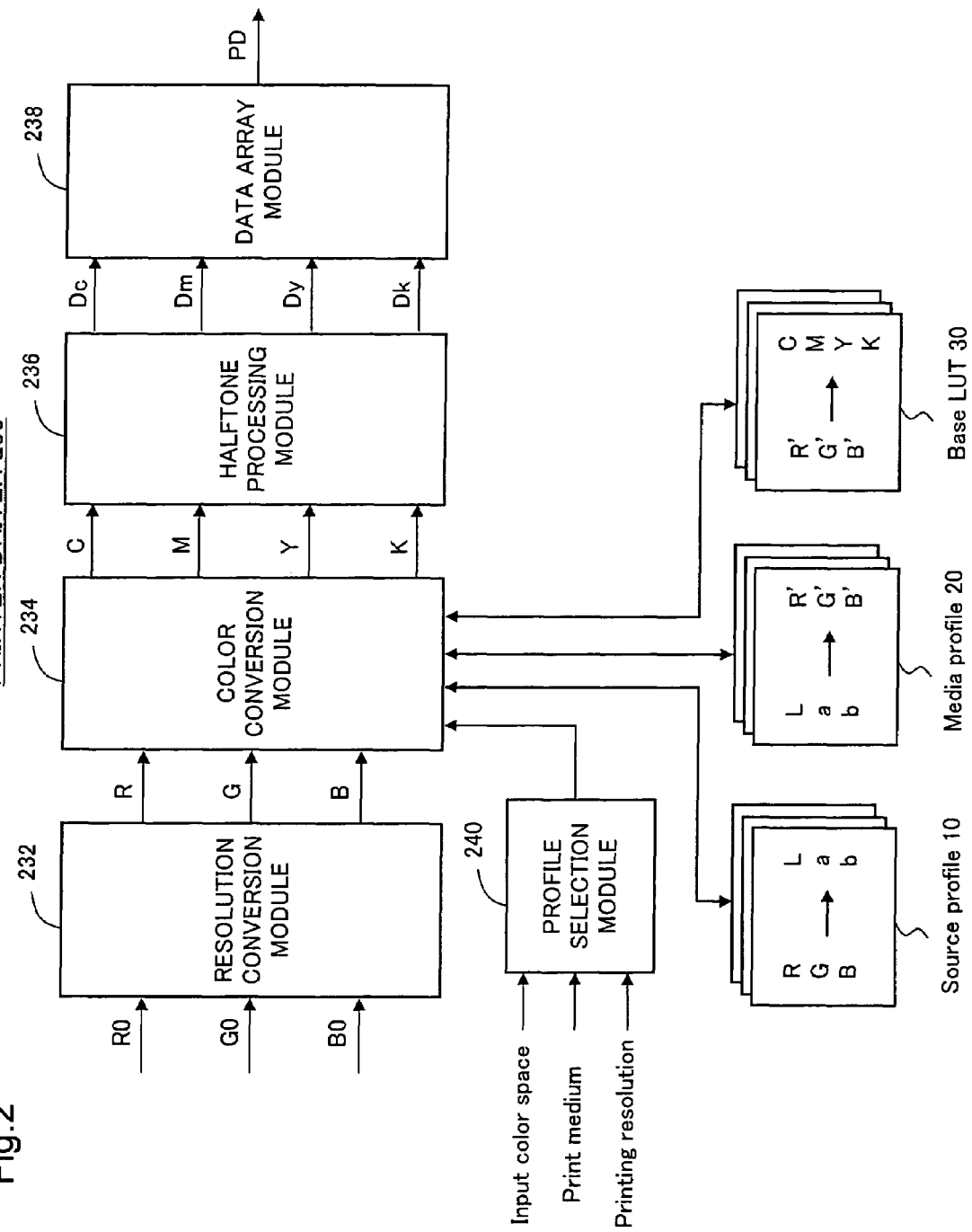
FIG. 2 is a block diagram illustrating the constitution of a printer driver in this embodiment.

FIG. 2 is a block diagram illustrating one example of the constitution of a printer driver 230, which is installed by the printer driver installer 214. The printer driver 230 comprises a resolution conversion module 232, a color conversion module 234, a halftone processing module 236, a data array module 238, a profile selection module 240 and three types of color conversion profiles 10, 20 and 30. The resolution conversion module 232 converts the resolution of the color image data that is input (R0, G0, B0) to resolutions suitable for processing that occurs in the color conversion module 234 and its downstream.

The color conversion module 234 uses the three types of color conversion profiles 10, 20 and 30, one at a time, to convert the color image data RGB to ink quantity data CMYK. When the printer driver 230 is installed, a plurality of profiles for each of the three types of color conversion profiles 10, 20 and 30 are stored on a hard disk of the computer 200.

The source profile 10 serves to convert the input color space to the profile connection color space. Various types of RGB color spaces can, for example, be used for the input color space. Typical RGB color spaces include the sRGB color space and the AdobeRGB color space (a trademark of Adobe Systems Incorporated). Device-independent color spaces such as the L*a*b* color space or the XYZ color space can be used for the profile connection color space.

The media profile 20 serves to convert the profile connection color space to a predetermined internal processing color space. Any color space may be used for this internal processing color space, but in the example shown in FIG. 3, a specific RGB color space (the R'B'G' color space) is used. It is preferable that the R'B'G' color space use a gamut that is wider than the sRGB color space (the standard color space for monitors). The media profile 20 in the present embodiment compensates for color reproduction differences due to print media, so as to provide color correction that allows substantially the same colors to be reproduced, even if different print media are used.

Base lookup tables 30 serve to convert the output color space of the media profile 20 (in this case the R'B'G' color space) to an ink color space for a plurality of inks that can be used by the printer 300. In this example, it is assumed that the printer 300 uses four types of inks for CMYK. Note that any other types of ink can be used by the printer 300. The base lookup tables 30 in the present embodiment are used to determine the suitable amount of ink within various limits relating to ink dot formation conditions, such as ink duty limits (the amount of ink that is allowed to be discharged per unit of surface area).

FIGS. 3A to 3C show the relationship between the three types of color conversion profiles 10, 20 and 30 and the printing parameters. A plurality of source profiles 10 are prepared in advance corresponding to a plurality of input color spaces. In the example shown in FIG. 3A, three source profiles SP1 to SP3 are prepared, corresponding to three input color spaces sRGB, AdobeRGB, and xRGB, wherein xRGB refers to a specific extended RGB color space having a wider gamut than sRGB.

A plurality of the media profiles 20 are also prepared in advance corresponding to a plurality of print media. The reason for this is that the media profile 20 serves to correct differences in color reproduction due to print media. In the example shown in FIG. 3B, three media profiles MP1 to MP3 are prepared, corresponding to three types of print media (plain paper, photo paper, and matt paper).

Base lookup tables 30 are prepared in advance so as to correspond to the various combinations of print medium and printing resolution. The reason for this is that the base lookup tables 30 serve to determine the suitable amounts of ink within various limits, such as those relating to the ink dot formation conditions, while the limits for the ink dot formation conditions are dependent on the type of print medium and the printing resolution. In the example shown in FIG. 3C, three base lookup tables BL1 to BL3 are prepared for three printing resolutions on plain paper: very low resolution R1 (360×360 dpi), low resolution R2 (720×720 dpi) and medium resolution R3 (1440×720 dpi). Furthermore, three base lookup tables BL4 to BL6 are prepared for three printing resolutions on photo paper: medium resolution R3 (1440×720 dpi), high resolution R4 (1440×1440 dpi) and very high resolution R5 (2880×1440 dpi). Likewise, three base lookup tables BL7 to BL9 are prepared for matt paper, using the same three printing resolutions as for photo paper, which is to say R3, R4 and R5. As will be understood from this example, the printing resolutions used by the printer 300 usually differ according to the print medium used. Note that the base lookup tables 30 are each prepared in advance and correspond to a plurality of predetermined printing resolutions for each print medium.

The profile selection module 240 selects one profile, which is suited to the printing mode used during actual printing, for each of the three types of color conversion profiles, and the color conversion module 234 performs the color conversion using the three selected profiles. Note that, in the present embodiment, the color conversion profiles 10, 20 and 30 are selected in accordance with three parameters; input color space, print medium and printing resolution.

The halftone processing module 236 generates dot formation data Dc, Dm, Dy and Dk, indicating a status of dot formulation at each printing pixel, by performing halftone processing for each of the inks. The data array module 238 produces an array of this dot formation data Dc, Dm, Dy and Dk and outputs the same as printing data PD.

Normally, the printer driver 230 is implemented as a program stored in a storage unit such as a hard disk within the computer 200. In this case, the printing data PD created by the printer driver 230 is supplied to the external printer 300. Alternatively, the printer driver 230 may be implemented within the printer 300. In this case, the printing data PD created by the printer driver is supplied to a print execution unit (printing mechanism) within the printer. Note that, if the printer driver is implemented within the computer 200, the external printer may be referred to as a "print execution unit." Accordingly, the printer driver 230 serves to generate printing data, which is supplied to the print execution unit and is generally based on color image data. Note that the resolution conversion module 232 and the data array module 238 may be omitted from the printer driver 230.

When printing, one profile for each of the three types of profiles 10, 20 and 30 is selected according to a plurality of parameters (input color space, print medium and printing resolution), and color conversion is performed by sequentially using the three selected profiles. Note that, in the present specification, a printing method determined by a plurality of parameters for selecting the three types of color conversion profiles 10, 20 and 30 may be referred to as a "printing mode."

Figure 4:
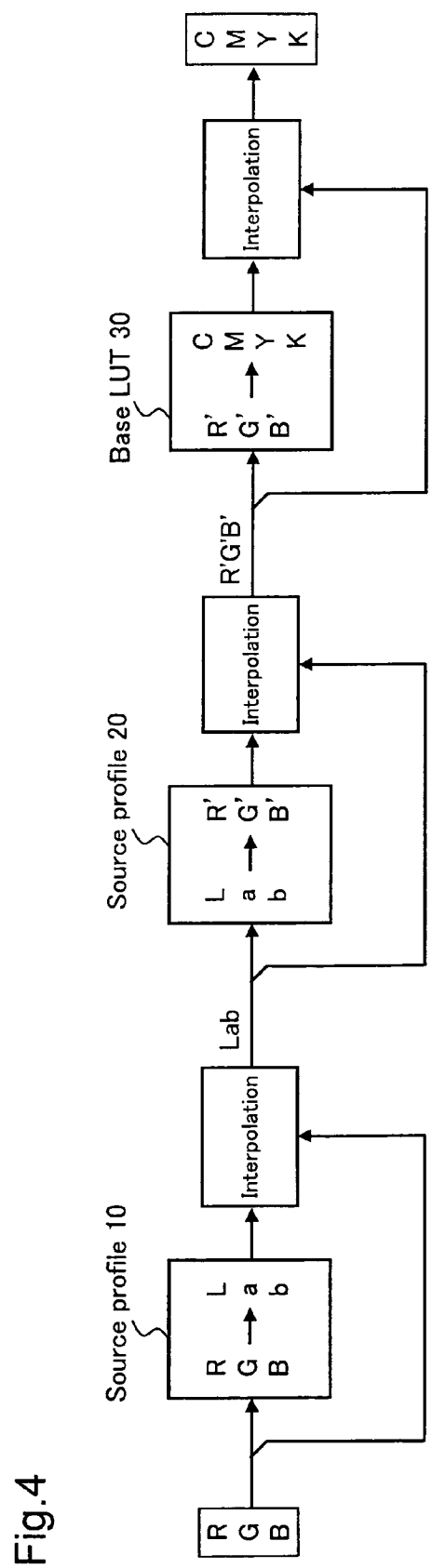
FIG. 4 is a schematic view illustrating the color conversion process in the embodiment.

FIG. 4 is a schematic view illustrating the color conversion process in the embodiment. In color conversion processing, first the input RGB values are supplied to the source profile 10 and converted to Lab values. Interpolation may be performed at this time if necessary, which is to say if the input RGB values do not match the input lattice points of the source profile 10. Examples of such interpolation include tetrahedron interpolation and the like.

The Lab values that are output from the source profile are input to the media profile 20 and converted to R'B'G' values. If necessary, interpolation may be performed. Likewise, the output R'B'G' from the media profile 20 is input to the base lookup table 30 and converted to ink quantities in CMYK, with interpolation performed as necessary.

Thus, in the present embodiment, the three types of color conversion profiles 10, 20 and 30 are selected, one profile for each type, according to the printing mode that is actually used in printing, and color conversion is performed by sequentially using the three selected profiles. Accordingly, an advantage is achieved by reducing the overall time necessary for print processing as compared to that in cases where the color conversion lookup tables are combined during printing.

Note that the present invention is in no way limited to the examples and embodiments described above and can be embodied in various modes without departing from the scope or gist of the invention, wherein the following modifications, for example, are possible.

(1) In the embodiment described above, color conversion is performed using three types of color conversion profiles, but the present invention can generally be applied to situations in which color conversion is performed using any plurality of types of color conversion profiles.

(2) In the embodiment described above, some of the structures implemented by way of hardware may be replaced by software, and likewise some of the structures implemented by way of software may be replaced by hardware.

The present invention has been described in detail and illustrated in the drawings, but these represent only one example, and the invention is not limited thereto. The spirit and the scope of the invention is, therefore, to be determined solely by the appended claims.

What is claimed is:

1. A color conversion method for a color printer comprising the steps of:
   (a) providing a plurality of color conversion profiles for each of plural types of color conversion profiles;
   (b) selecting one color conversion profile for each of the color conversion profile types, according to a printing mode used when printing; and
   (c) performing color conversion by sequentially using the selected color conversion profiles, without combining these selected color conversion profiles;
   wherein the printing mode is determined based on a plurality of parameters including input color space, print medium and printing resolution,
   and wherein the plural types of color conversion profiles include:
   a plurality of a first type of color conversion profiles, one of which is selected according to the input color space;
   a plurality of a second type of color conversion profiles, one of which is selected according to the print medium; and
   a plurality of a third type of color conversion profiles, one of which is selected according to a combination of print medium and printing resolution.

2. The color conversion method recited in claim 1, wherein the first type of color conversion profile serves to convert a first RGB color space, which is the input color space, to a predetermined profile connection space,
   the second type of color conversion profile serves to convert the profile connection space to a second RGB color space, and
   the third type of color conversion profile serves to convert the second RGB color space to an ink color space for a plurality of inks used by a specific printer.

\* \* \* \* \*